Patented Feb. 26, 1946

2,395,638

UNITED STATES PATENT OFFICE 2,395,638

HYDROXYLATION OF AROMATIC HYDROCARBONS

Nicholas A. Milas, Belmont, Mass., assignor to Research Corporation, New York, N. Y., a corporation of New York No Drawing. Original application March 7, 1941, Serial No. 382,273. Divided and this application March 16, 1942, Serial No. 434,981

8 Claims. (Cl. 260—396)

This invention relates to the catalytic oxidation of unsaturated organic compounds, and its principal object is to provide a simple, economical and efficient process of producing useful oxygenated organic compounds such as glycols, phenols, aldehydes, ketones, quinones and organic acids.

Further objects will be apparent from a consideration of the following description wherein I have illustrated the application of my new process in the preparation of various substances constituting the class of oxygenated organic compounds.

The present application, which is a division of my application Serial No. 382,273, filed March 7, 1941, is particularly concerned with the hydroxylation of aromatic hydrocarbons, which latter term is intended to refer to benzene, naphthalene, anthracene, phenanthrene, and the like and to hydrocarbons of their series.

I have found that when an aromatic hydrocarbon is treated with hydrogen peroxide, in an initially substantially anhydrous environment, e. g., in the presence of an essentially anhydrous inert organic solvent, and of a small amount of a catalytically active oxide of a metal known to form very unstable peracids rather than peroxides, including Os, Ti, Zr, Th, V, Nb, Ta, Cr, Mo, W, U and Ru—(see J. A. C. S., 59, pages 2342 and 2343; and Berichte, 41 (1908), page 3536), preferably, osmium tetroxide, ruthenium tetroxide, vanadium pentoxide, molybdenum oxide or chromium trioxide—in an essentially non-alkaline environment (that is, in the absence of an inorganic base), there is produced an oxygenated organic compound, the nature of which depends upon the particular type of unsaturated compound subjected to such treatment, the temperature, the pressure (if the compound treated be in gaseous phase), the solvent medium, the extent of oxidation and other such factors. In the case of benzenoid hydrocarbons the glycols produced dehydrate to yield phenols which may be further oxidized to produce quinones.

For benzene, toluene, naphthalene, anthracene, phenanthrene and the like, the addition of hydrogen peroxide may be illustrated as follows:

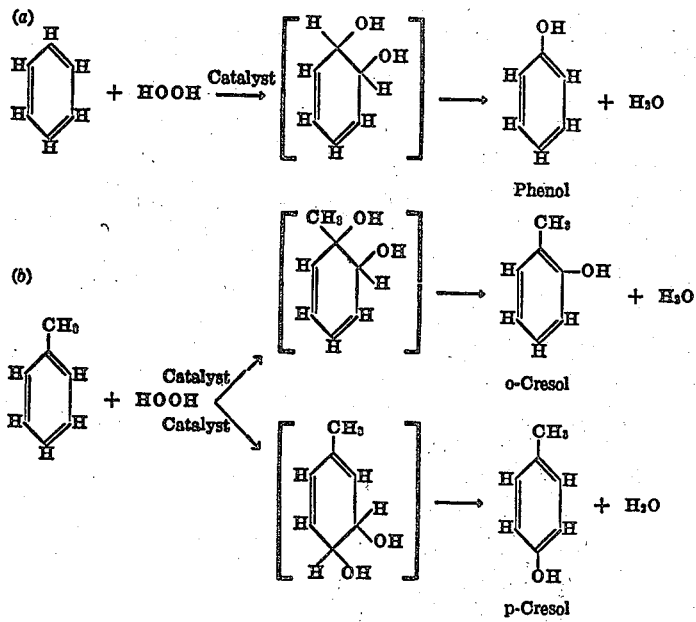

(c) 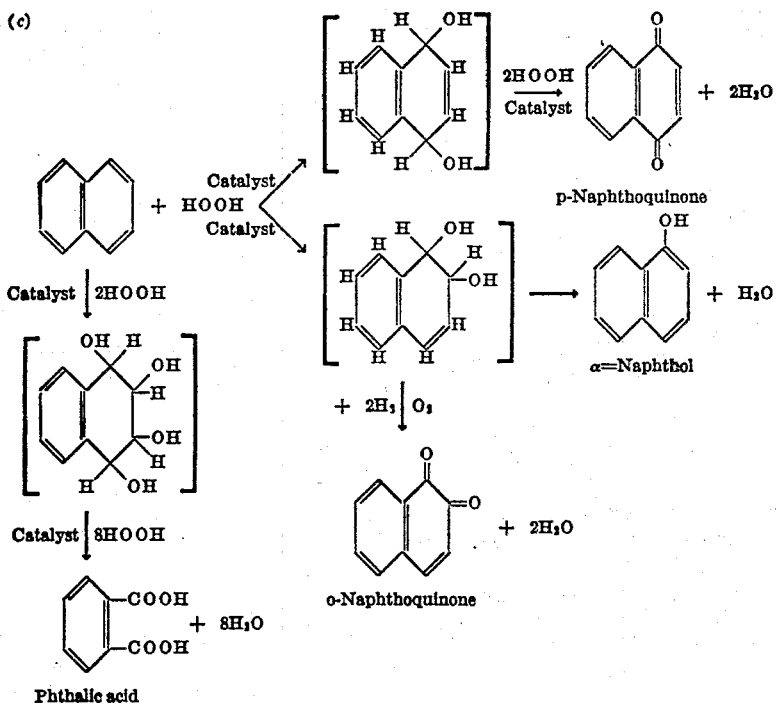

(d) 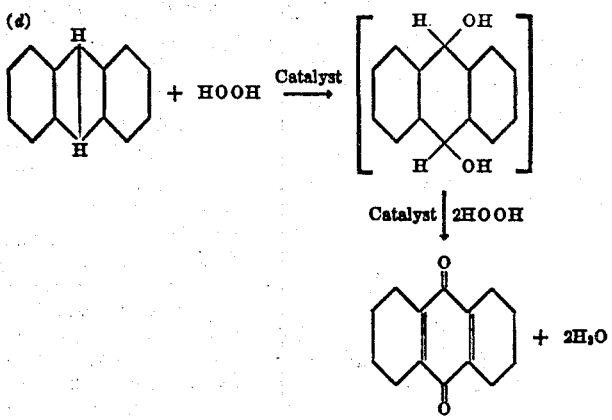

(e) 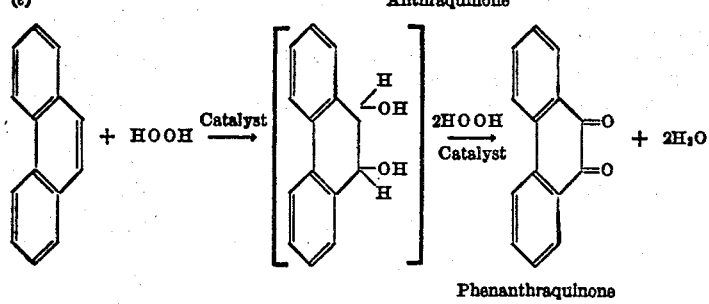

In carrying out my process successfully, it is advisable to employ substantially anhydrous solvents, preferably selected from such organic substances that do not undergo oxidation during the reaction. Tertiary alcohols in general, and particularly tertiary butyl and tertiary amyl alcohols, have been found to be suitable solvents for this purpose, although it is to be understood that the invention is not confined to these solvents since various other reagents, such as nitriles and certain types of ethers, acetic acid-tertiary alcohol mixtures, etc., may be used to advantage. Illustrative of operable nitriles is acetonitrile. Illustrative examples of operable ethers include: ethyl, propyl, butyl and amyl dioxane, ethers of ethylene glycol and diethylene glycol, etc. Among operable inert (that is, unreactive) organic solvent media is nitromethane. The organic solvent employed is, in all cases, strictly a medium or vehicle, and is not a reactant.

The reaction mixture (material to be oxidized, the hydrogen peroxide treating agent, the organic solvent medium—where used—and the catalyst) preferably is initially substantially anhydrous.

A preferred procedure for the preparation of the hydrogen peroxide reagent in tertiary butyl alcohol is as follows:

400 cc. of pure tertiary butyl alcohol is added to 100 cc. of 30% hydrogen peroxide (Albone C), and the solution treated with small portions of anhydrous sodium sulphate, thereby forming two layers. The alcohol layer, containing most of the hydrogen peroxide, is removed. The so separated hydrogen peroxide-rich layer may be used without further treatment; however, I may further dehydrate the same by treating it with more anhydrous sodium sulphate, and finally with anhydrous calcium sulphate or magnesium sulphate. A solution containing approximately 6% hydrogen peroxide in tertiary butyl alcohol is thus obtained, and this solution may be concentrated by vacuum distillation of the alcohol at room temperature to any desired concentration without loss of the peroxide, provided an all-glass or other suitable apparatus is employed.

An osmium tetroxide catalyst may be prepared by dissolving substantially anhydrous osmium tetroxide in substantially pure tertiary butyl alcohol, free from isobutylene.

A chromium trioxide catalyst similarly may be prepared by dissolving substantially anhydrous chromic acid ($CrO_3$) in a substantially pure saturated tertiary aliphatic alcohol ($(C_nH_{2n+1})_3COH$, e. g., substantially pure tertiary butyl or amyl alcohol, or in a substantially anhydrous mixture of acetic acid and a tertiary alcohol; or, the substantially anhydrous $CrO_3$ may be added directly in the solid form to the substantially anhydrous medium containing hydrogen peroxide and the substance to be hydroxylated. Preparation of the other catalytic metal oxides may similarly be formed by dissolving the metal oxide in one or another of the organic solvents above stated. Or, the selected catalytic metal oxide may be added, in powdered or finely divided state, to the hydrogen peroxide reagent wherein the same eventually dissolves forming a completely homogeneous solution. The catalyst may be used alone or in combination.

I have found that the temperature plays an important role in directing the type of oxygenated product to be formed. For example, formation of glycols in high yields is usually favored between room temperature (e. g., 21° C.) and several degrees below 0° C., whereas aldehydes, ketones and organic acids are produced more advantageously at temperatures higher than room temperature (e. g., between 21° C. and the boiling point of the non-aqueous solvent employed).

The following examples are illustrative of the application of the invention:

*Liquid and solid unsaturated substances—hydrocarbons*

The unsaturated hydrocarbons are dissolved or mixed with the peroxide reagent containing a suitable catalyst of the type previously suggested and the reaction is allowed to proceed either at or below room temperature if glycols are desired, or above room temperature if aldehydes, ketones and organic acids are desired. The hydrocarbons may be present preferably in the ratio of one mole to one or two moles of the peroxide, although greater excess of peroxide is necessary when aldehydes, ketones and acids are desired. The speed of the reaction up to certain limits depends upon the concentration of the catalyst which may be present preferably in concentrations from .05 g. to .5 g. per mole of the substance to be oxidized, although it is to be understood that these limits may at times be exceeded without affecting appreciably the yields of the oxygenated products. The end of the reaction is usually indicated by a color change or by the absence of peroxide. The glycols or other oxygenated products may then be separated either by fractionation or in any other well known manner. Using this general procedure I have succeeded in producing 58% cyclohexane diol-1,2 and about 35% adipic acid from cyclohexene; 22–30% phenol from benzene; about 30% of cresols from toluene; and almost quantitative yield of anthraquinone from anthracene. The yields in all cases were based on the amount of hydrocarbon used up in the reaction.

In carrying out the hydroxylation treatment on naphthalene illustrated hereinbefore by graphical formulae, the reaction mixture preferably is refluxed at an elevated temperature, e. g., at a temperature just short of the boiling point of the organic solvent medium being employed. In reacting equimolecular quantities of the peroxide reagent and naphthalene it is assumed, from the fact that some alpha-naphthol is produced as well as para-, and ortho-, naphthaquinones, that there are produced initially unstable compounds wherein hydroxyl groups add at the 1,4, and 1,2, positions, respectively, from which latter unstable intermediate compound 1 mol of water may spontaneously separate to form alpha-naphthol; also that the two unstable intermediate compounds can and do react with two more molecules of hydrogen peroxide to form the p-, and o-, naphthaquinone, together with split off water. Similarly, it is assumed, from the fact that phthalic acid also is produced by the present process, that two molecules of hydrogen peroxide react with the naphthalene starting material initially to form a 1,2,3,4-tetrahydroxylated compound, which latter reacts with eight more molecules of hydrogen peroxide to yield the phthalic acid.

I claim:

1. The process of producing hydroxy derivatives of aromatic hydrocarbons which comprises treating the aromatic hydrocarbon with hydrogen peroxide in an initially substantially anhydrous environment, in the presence of an oxide of a metal which forms unstable peracids.

2. The process of producing phenol which comprises treating benzene with hydrogen peroxide in an initially substantially anhydrous environment, in the presence of an oxide of a metal which forms unstable peracids.

3. The process of producing a cresol which comprises treating toluene with hydrogen peroxide in an initially substantially anhydrous environment, in the presence of an oxide of a metal which forms unstable peracids.

4. The process of producing oxygenated compounds including naphthoquinone from naphthalene which comprises treating naphthalene with an initially substantially anhydrous solution of hydrogen peroxide in an organic solvent medium, in the presence of an oxide of a metal which forms unstable peracids.

5. The process as defined in claim 4, in which the reaction is effected at a temperature between normal room temperature and the boiling point of the solvent medium and while using several mols of hydrogen peroxide for each mol of naphthalene.

6. Process defined in claim 1, in which the hydrogen peroxide is in solution in an inert organic solvent medium consisting essentially of a tertiary monohydric saturated aliphatic alcohol.

7. The process of producing phenol, which comprises treating benzene with an initially substantially anhydrous solution of hydrogen peroxide in an inert organic solvent medium therefor and in the presence of a catalyst selected from a group of the oxides of osmium, ruthenium, vanadium, chromium, and molybdenum.

8. The process of producing oxygenated aromatic compounds of the types of phenols and quinones directly from aromatic hydrocarbons, which comprises treating the aromatic hydrocarbon with at least an equimolecular quantity of hydrogen peroxide in an initially substantially anhydrous solution thereof in an inert organic solvent medium, in the presence of a catalyst selected from the group consisting of the oxides of osmium, ruthenium, vanadium, chromium and molybdenum.

NICHOLAS A. MILAS.